Patented Feb. 14, 1950

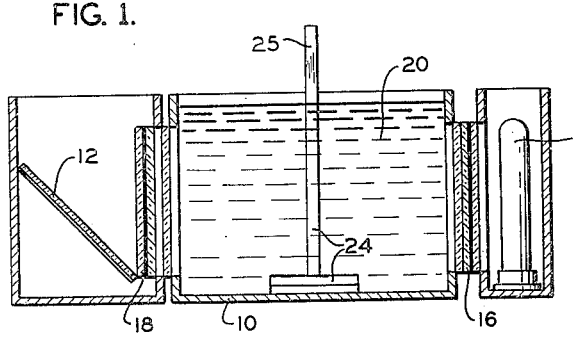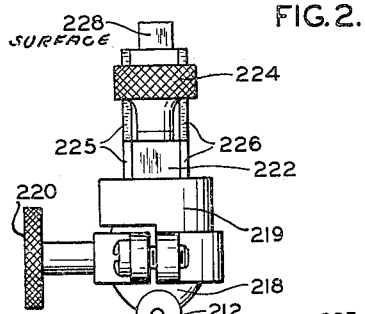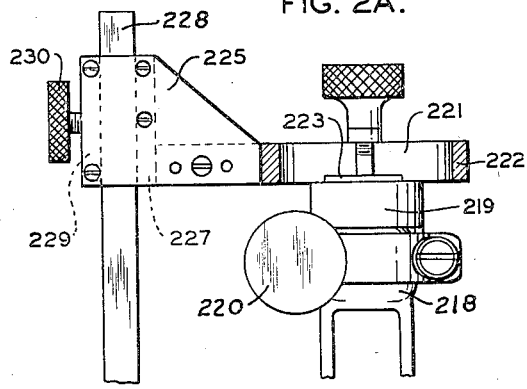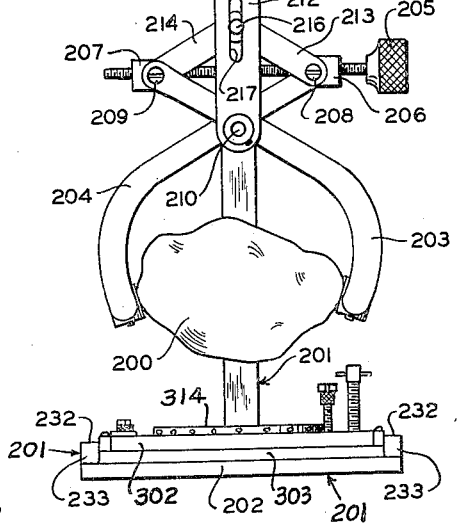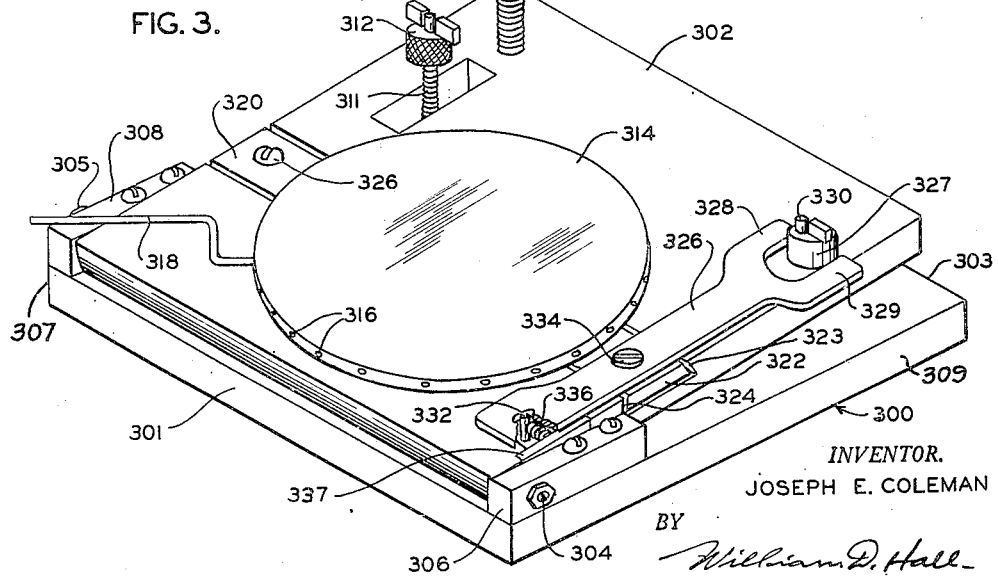

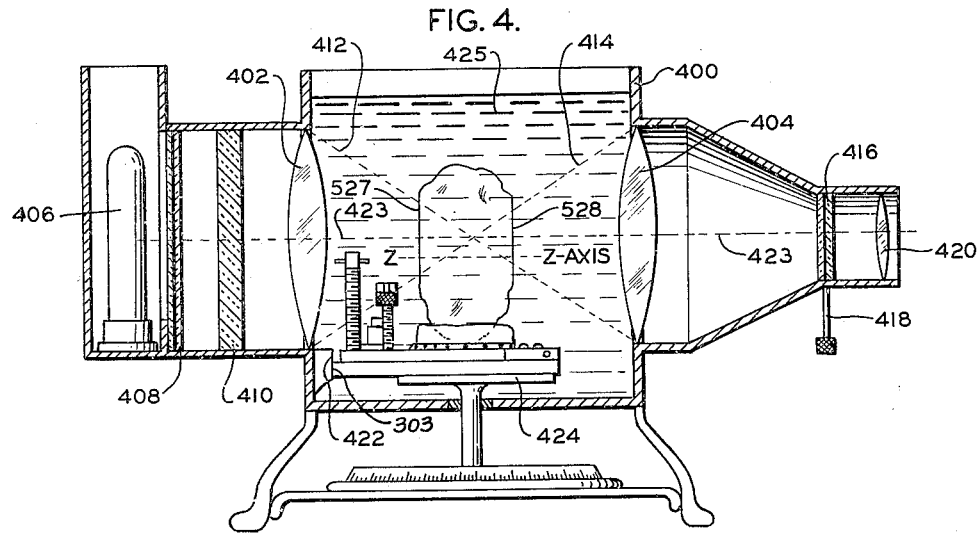
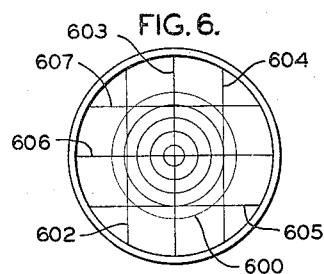
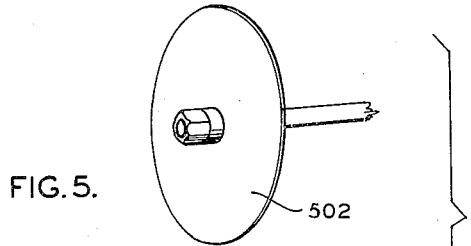
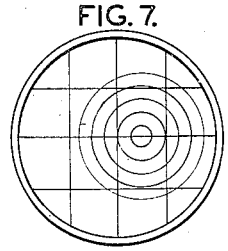
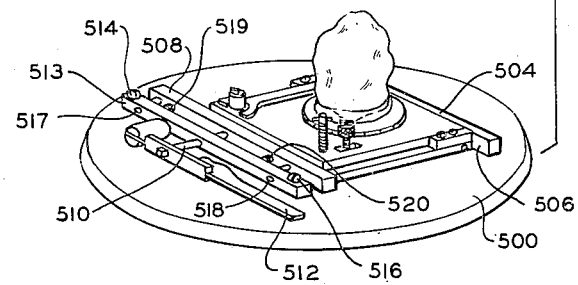
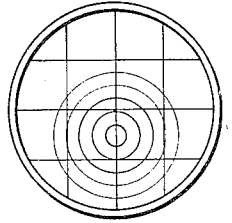

2,497,070

UNITED STATES PATENT OFFICE 2,497,070

CRYSTAL ANALYSIS APPARATUS HAVING A REMOVABLE CRYSTAL HOLDER

Joseph E. Coleman, Red Bank, N. J., assignor to the United States of America as represented by the Secretary of War Application May 18, 1945, Serial No. 594,467

3 Claims. (Cl. 88—14)

(Granted under the act of March 3, 1883, as amended April 30, 1928; 370 O. G. 757)

The invention described herein may be manufactured and used by or for the Government for governmental purposes, without the payment to me of any royalty thereon.

This application is the parent of a divisional patent application entitled "Crystal analysis apparatus," Serial Number 635,829, filed December 18, 1945, which has become Patent No. 2,418,463.

This invention relates to an apparatus for determining the locations of the axes in crystals, and more particularly, to polariscopes, conoscopes, and auxiliary clamps, and jigs used for facilitating proper orientation of unfaced quartz crystals and subsequent cutting of the oriented crystals.

The manufacture of the piezo-electric vibrator plates used in the radio industry for stabilizing the frequency of oscillators and band-pass filters depends upon the state of the quartz crystal, i. e., whether it has crystal faces or areas on the surface that have a well-defined pattern, or whether the crystal pattern has been obliterated by the erosive action. The "faced" quartz has crystal faces which at once define the location of certain guiding lines through the crystal, called the reference axes, for crystal cutting, and it is comparatively simple to determine the positions of these guiding lines in the faced quartz, since they have definite relations to the various faces. The bulk of the raw material, however, comes in irregular masses broken out of large mother crystals with no evidence of any of the crystal faces. This is known as "unfaced" quartz, and in the manufacture of oscillator plates it becomes necessary to locate accurately the reference axes in order that the final plate will have a definite pre-selected relationship with respect to these reference axes. This is known as orientation of the oscillator plate.

The steps that are followed in obtaining properly oriented oscillator plates from an irregular mass of raw unfaced quartz are: Identification of the reference axes, or the Z, X and Y axes, the handedness of the crystal, and the electrical polarity of the X-axis.

The invention discloses improvements in the apparatus for identifying the Z-axis or optical axis of the quartz crystal when it is in the form of an irregular mass of unfaced quartz. More specifically the invention resides in the improvements in the polariscope, the conoscope, and the provision of auxiliary clamp and jig which can be used with the polariscope and conoscope, respectively, for determining the optical axis of quartz, and upon the determination of the optical axis, the jig, together with the quartz specimen fastened to it, can be transferred directly to a cutting saw; the polariscope, the conoscope, the jig, and the cutting saw are all provided with the reference surfaces or planes which are used for transferring conveniently the optical axis determinations made in the polariscope and conoscope onto the turn-table of the cutting saw.

In the prior art neither the polariscope nor the conoscope were provided with the reference surfaces or clamps and jigs disclosed in this specification, with the result that the precise optical axis determinations, especially those possible with the conoscope, were, to a very large extent, lost during the transfer of quartz from the polariscope or conoscope onto the turn-table of the cutting saw. The invention discloses improvements in the above-mentioned apparatus which eliminate the errors which took place during the orientation process of the unfaced quartz with the old methods.

It is, therefore, an object of this invention to provide a polariscope and a conoscope with the instrumentalities which make it possible to orient the unfaced quartz crystal in the proper manner with respect to the polarized light for determining the Z-axis of the crystal, these instrumentalities including reference surfaces, preferably plane surfaces, in the polariscope and conoscope which match the reference surface of the jig, whereby the optical axis determinations obtained in the polariscope can be conveniently transferred from the polariscope to the cutting saw and from the cutting saw to the conoscope, and the optical axis determinations made in the conoscope may be transferred to the turn-table of the cutting saw without the loss of precision in determining the optical axis which is possible with the polariscope and the conoscope.

This and other features of the invention will be more clearly understood from the following detailed description and the accompanying drawings in which Figure 1 is a cross-sectional view of the polariscope with a stand for the clamp used in connection with the polariscope, Figure 2 is an elevational view of the tongs clamp used in connection with the polariscope illustrated in Figure 1, Figure 2A is a side view of the upper portion of the clamp shown in Figure 2, Figure 3 is a perspective view of the jig used in the conoscope, Figure 4 is the vertical cross-sectional view of the conoscope with the conoscope jig placed in its tank, Figure 5 is a perspective view of the turn-table and of the diamond-saw disk used for cutting quartz crystals, Figures 6, 7, and 8, are views of the interference patterns obtainable in the conoscope.

The approximate determination of the Z-axis is usually carried out in the polariscope. This is a glass-walled immersion tank 10, Fig. 1, fitted with a reflecting mirror 12 at one end with a source of ordinary or partially monochromatic light 14 at the other end. Polaroid plates 16 and 18, with their transmission axes set at right angles, are placed at each end of the tank so that the light is cut off when the source of light is viewed in the reflecting mirror. The tank contains a liquid 20 having the same, or nearly the same, index of refraction as the average index of refraction of quartz for increasing the amount of incident light that enters the quartz. In air, much of the incident light would be lost by refraction and scattering at the quartz surfaces. The immersion liquid commonly used is Russian mineral oil although its index is less than that of quartz; tricresyl phosphate and tetralin have better indices but are injurious to the skin.

For obtaining the direction of the optical axis only in a very approximate manner, the quartz is placed in the polariscope by hand and rotated by hand until the Z-axis is approximately parallel to the direction of the polarized light. The light emerging from the quartz will no longer be polarized in the plane of polarization it had when it entered the quartz since quartz rotates the plane of polarization. Since the plane of polarization has been changed, the second "polaroid" 18 no longer cuts off the light and a brilliant image of the quartz and an interference pattern is seen in the reflecting mirror. When this is the case, the Z-axis is parallel to the direction of the incident light.

After the quartz has thus been oriented, it is removed from tank 10 and placed in the clamp illustrated in Fig. 2 with the Z-axis being in a plane parallel to the bottom plate 202 of a stand 201 which supports the clamp and also parallel to a reference surface 233. Since quartz 200 has been held by the hand of the operator, relatively large errors take place during transferring of quartz from tank 10 to the clamp, and it is reoriented once more in the polariscope with the aid of the clamp.

The clamp itself consists of adjustable tongs 203, 204 connected to a thumb screw 205 by means of threaded blocks 206 and 207, which are swiveled in the upper portion of the tongs by means of bolts 208 and 209. The spacing between the tongs can be either increased or decreased by turning thumb screw 205. The tongs swivel around a pin 210 mounted in a bifurcated member 212 welded to a ball 218, as seen more clearly in Fig. 2A. The vertical position of the tongs with respect to the bifurcated member 212 is fixed by means of pin 210, links 213 and 214, and a pin 216, pin 216 sliding up and down in a slit 217 when the thumb screw 205 is adjusted. The upper portion of the bifurcated member 212 terminates in a ball 218 which fits into a socket 219, the two forming a ball-and-socket joint. The ball-and-socket joint may be turned or tilted to any desired position and clamped in the desired position by means of a threaded clamping member 220. Socket 219 is connected to a forwardly extending rectangular bar 222 provided with a vertical slot 221, Fig. 2A, and the position of the clamp with respect to bar 222 may be adjusted by sliding it back and forth in slot 221, whereupon it may be locked in any desired position along the slot by means of a threaded locking knob 224. The upper portion of socket member 219 is provided with a guiding member 223, Fig. 2A, which prevents member 219 from turning in slot 221. Bar 222 is fastened to two brackets 225 and 226 which, together with two cross-members 227 and 229 (Fig. 2A), form a rectangular opening which fits over a rectangular rod 228 of the stand, the rod being fastened to the base plate 202 of the stand. The entire clamp may be raised or lowered on the rectangular rod 228 by operating a set screw 230.

After the approximate determination of the Z-axis has been accomplished, with the crystal held by the hand of the operator, quartz crystal 200 is transferred to the clamp and clamped between the tongs 203 and 204 in the manner indicated in Fig. 2, but with the tongs 203 and 204 turned 90° from their position in Fig. 2 and the entire clamp is removed from rod 228 and placed on a similar rod 25 of a stand 24, Fig. 1, in tank 10 of the polariscope. In Fig. 2 the adjustable tongs 203—204 and the jig have been turned 90° from their normal position for illustrating more clearly the construction of the clamp; in actual use the clamp and the jig are turned around the vertical axis so as to be at right angles to the position indicated in Fig. 2. The side of rod 25 visible in Fig. 1 is parallel to the direction of the parallel component of the polarized light reaching the plane of the mirror. The position of quartz specimen 200 with respect to the incident light is now adjusted once more by using the ball-and-socket joint 218, 219 and by sliding the clamp in the horizontal slot 221. When the brightest obtainable image of the quartz specimen and the brightest interference pattern is obtained on mirror 12, the ball-and-socket joint is locked by means of the locking member 220. The position of the clamp in the horizontal slot is also locked by means of locking knob 224. It is now possible to transfer the quartz specimen once more back to stand 201, the plane surfaces of the rectangular rods 25 and 228 acting as guiding means for the clamp while it is first on stand 24 and then on stand 201 so that the position of the Z-axis, as determined in the polariscope, may now be retained with a greater degree of accuracy during this transferring of the quartz from the polariscope to stand 201. Base plate 202 of stand 201 is provided with a rectangular bar 232 placed in front of rod 228 and extending across the base plate. Only the extreme ends of bar 232 are visible in Fig. 2, these ends being numbered by the same numeral 232, and the remaining midportion of the rod in Fig. 2 is not visible because of the jig placed on the base plate 202 in front of the bar. The side surface 233 of this bar, only partially visible in Fig. 2, is parallel to the visible front surface of rod 228 (i. e. both surfaces are at right angles to the bottom and top surfaces of base plates 202). It is surface 233 of bar 232 and flat surfaces of plate 202 that act as the previously mentioned reference surfaces, and they are used for transferring the second Z-axis determination (with the clamp) to the conoscope with the aid of the cutting jig illustrated in Fig. 3 which is provided with the reference surfaces matching surface 233 during the succeeding transferring operations as will be described later.

After this second determination of the Z-axis in the polariscope with the aid of the clamp, the quartz specimen is cemented to the cutting jig illustrated in Figures 3 and 2.

The jig consists of a flat rectangular base plate 300, a smaller rectangular plate 302 hinged to one edge of the base plate 300 by means of set screws 304 and 305 which terminate in the adjustable cone bearings within plate 302. The set screws are fastened to the base plate 300 by means of rectangular blocks 306 and 308, and locking nuts. A set screw 310 is in threaded engagement with the upper plate 302, the lower portion of the set screw terminating in a conical bearing provided on plate 300 so that turning of the set screw raises or lowers plate 302 in the manner illustrated in Fig. 3. The position of plate 302 may be locked in any desired angular position with respect to plate 300 by means of a locking nut 312 mounted on a threaded rod 311 fixed to plate 300. The adjustable plate 302 is provided with a round well or a counter-bore for accommodating a disk 314. Disk 314 projects above the upper surface of plate 302 and the projecting portion of the disk is provided with holes 316 which are used for turning the disk by means of a bent wire wrench 318. The lower portion of disk 314 is beveled so that locking shoes 320 and 322, with corresponding circular beveled edges which engage disk 314, will hold the disk down against plate 302 as well as lock it against rotation when shoe 322 is pressed against the disk. The locking shoes 320 and 322 are mounted in two slots with beveled side edges, such as 323 and 324, which engage the beveled side edges of the shoes so that tight engagement of the beveled and circularly curved inner ends of the shoes against the beveled rim of the disk is possible without lifting of the shoes out of their seats in plate 302. The locking shoes are diametrically opposite each other on two sides of disk 314. Shoe 320 is held fixed in plate 302 by means of a set screw 326, while shoe 322 is connected to a locking lever arm 326 operated by a cam 327 working between the bifurcated members 328 and 329 of the arm. The cam is mounted on a pin 330 which is fixed to plate 302. Approximately mid-way between the bifurcated end of the arm and a spring-controlled fulcrum 332 at the opposite end of the arm, the arm is fastened to shoe 322 by a set screw 334 with the result that turning of cam 327 oscillates the arm around its fulcrum 332 and shifts the locking shoe 322 either into the locked or unlocked positions. When shoe 322 is in the locking position the pressures exerted by the two shoes hold disk 314 down against the bottom of the well in plate 302 as well as against any possible rotation. To allow for wear of the locking mechanism and for differences in the diameters of the disks, a spring 336 is placed between fulcrum 332 and a side plate 337 so that when the cam is turned and locking shoe 322 engages disk 314, pressure is exerted on spring 336 by pin 332. The spring must have sufficient strength to exert the necessary locking force on shoe 322. It is desirable to have fulcrum 332 spring-controlled since the variations due to the manufacturing tolerances in the dimensions of several disks which may be used in the jig may result in excessive pressure on fulcrum 332 and its shearing off when the disks have large diameters, and lack of sufficient locking pressure on the disk when the disks are of small diameter.

Since this jig is also used in the conoscope, in which case it is placed in the oil tank of the latter, the elevating and locking screws 310 and 312, and cam 327, are all provided with similarly shaped heads, nuts, or studs so that the same wrench can be used for operating them through oil used in the conoscope.

The cutting jig is used for holding quartz 200 in the properly oriented position with respect to the reference edge 301 of the jig in all subsequent operations, which include transferring of quartz from the clamp and stand 201 to the turn-table of the cutting saw; from the cutting saw to the conoscope; and finally from the conoscope again to the turn-table of the cutting saw. The purpose of all these operations is to make a "Z-block" from quartz 200 which is accomplished when the Z-axis is made parallel to the bottom surface of the base plate 300 and perpendicular to the reference edge 301 of the jig, and two "windows" are cut at both ends of the Z-axis, the planes of the windows being perpendicular to the Z-axis.

Reverting once more to Fig. 2, the quartz secured in the tongs of the clamp is heated over a hot plate and is then mounted on the cutting jig. The cutting jig is placed on the base plate 202 with either reference surface 309 or 307 of the jig matching surface 233 of bar 232 so that the optical axis is perpendicular to the surface 301. In Fig. 2, jig 300 is illustrated in the position in which surface 301 matches surface 233, since the tongs in Fig. 2 have been turned 90° from their normal position, as mentioned previously. Thus, in Fig. 2 the position of the jig matches the illustrated position of the tongs. In actual operation the jig and the tongs are turned 90° from the position illustrated in Fig. 2. A paper collar is then placed on the projecting portion of the disk 314 and the quartz specimen 200 is lowered on the rectangular rod 228 into the cup formed by the paper ring and disk 314. The cup is then filled with a mixture of rosin and beeswax which has been rendered liquid by heat. When the mounting cement has cooled and hardened, the clamp is removed by opening the tongs 203, 204, and the specimen is then ready for the first saw cuts.

The saw is illustrated in Fig. 5. It consists of a turn-table 500 and a diamond saw disk 502. The turn-table 500 is provided with a guiding bar 504, the inner side surface 506 of which is exactly parallel to the plane of the saw disk 502. The reference edge 301 of the cutting jig is placed against the reference edge 506 of bar 504 on the turn-table of the saw so that the saw will cut the quartz at right-angles to the Z-axis. Two flat windows 527, 528 (see Fig. 4) are now sawed at the ends of the optic axis, sufficient amount of quartz being sawed off at both ends of the optic axis so that the areas of the two windows overlap each other to some extent. In order to hold the cutting jig securely on the turn-table against the reference bar 504, the turn-table is provided with a locking bar 508 which is connected by means of a pin 510 to a lever arm 512. The lever arm is mounted on a bar 513 fixed to the turn-table of the saw by means of set screws 514 and 516. Four guiding pins (pins 517, 518, and two additional pins under springs 519 and 520) are used for aligning the locking bar 508 with bar 513 and for mounting springs 519 and 520 on the pins. The springs exert sufficient pressure on the cutting jig so as to hold the reference edge 301 of the jig securely against the reference bar 504 of the turn-table.

The Z-axis of quartz may be determined in the polariscope with the aid of the clamp of Fig. 2 only within two degrees, and therefore the saw cuts 527, 528 made in the X—Y plane of the crystal may not be exactly perpendicular to the true optic axis of the crystal. Since the plane of the X—Y cuts should be within fifteen minutes, which is the limit of tolerated error, approximate determination of the Z-axis in the polariscope is followed by a more precise determination of the position of the Z-axis with respect to the windows in a conoscope shown in Fig. 4.

It should be mentioned here that making of cuts 527, 528 is necessary prior to the exact location of the Z-axis in the conoscope because the intensity of the monochromatic light in the conoscope is so low that proper facing of the crystal is necessary to avoid undue scattering of light by the unfaced, irregular surfaces of the quartz, and, moreover, for obtaining fairly well-centered interference patterns (Figures 6 to 8), which will be described later.

Referring to Fig. 4, which illustrates the vertical, cross-sectional view of the conoscope, it consists of an immersion tank 400 provided with two windows for mounting two optical systems 402 and 404 on two sides of the tank. (Actually the optical system of the conoscope is much more complex, and the illustrated condensers represent only a diagrammatic showing of the optical system). A source 406 of approximately monochromatic light is placed in line with the optical axis of the lenses, this source being, in the majority of the cases, a mercury lamp. The source is placed in front of a "polaroid" plate 408—called the polarizer—which polarizes the light entering the conoscope. Since the mercury lamp spectrum is not strictly monochromatic, a monochromatic filter 410 is placed between the polarizer and condenser 402 so that only monochromatic light enters condenser 402. The optical system 402 produces a convergent cone of light 412, the apex of the cone being approximately in the middle of the tank. After reaching the apex of the cone, the light diverges into a divergent cone 414 which is intercepted by the second optical system 404; the second optical system in turn focuses the light on a "polaroid" plate 416 called the analyzer. The analyzer is rotated by a shaft 418 and a ratchet (not illustrated in the drawing), which permits the rotation of the analyzer only in one direction. An eye-piece lens 420 is provided with cross-hair filaments 602 through 607 (see Fig. 6) which are used for determining the position of the interference pattern 600 or the ring images produced by quartz on analyzer 416. When the ring images 600 are exactly centered with respect to the cross-hairs 602 through 607, the Z-axis is parallel to the optical axis of the conoscope. The immersion tank 400 is filled with special oil 425 having the index of refraction substantially equal to the index of refraction of quartz. For a more detailed description of the conoscope reference is made to the U. S. Patent 2,352,072 of W. L. Bond issued June 20, 1944.

In order to provide some convenient and precise mechanical means for transferring the exact Z-axis determinations obtained in the conoscope to the turn-table of the saw, the cutting jig is used in the conoscope in the manner described below. The immersion tank 400 of the conoscope is provided with a reference edge or surface 422, the plane of this surface being perpendicular to the optical axis 423 of the instrument. The conoscope is also provided with a flat plate 424, the finely finished upper surface of which lies in a plane parallel to the optical axis 423 of the conoscope. This surface is used for supporting the cutting jig. The jig is placed into the immersion tank on plate 424 in the manner illustrated in the figure with the reference surface 303 of the jig matching the reference surface 422 of the conoscope. A clamp bar, similar to clamp bar 508 of the cutting saw, may be secured to plate 424 for holding the jig against edge 422. The ring images 600 may now be centered on the cross-hair filaments of the eye-piece by rotating disk 314 if the common center of the ring is displaced laterally with respect to the center cross-hair 603, as illustrated in Fig. 7. If the common center of the rings is below the intersection of the cross-hair filaments, as illustrated in Fig. 8, they may be properly centered or raised so that the center of the interference rings coincides with the intersection of the cross-hairs 603 and 606, as illustrated in Fig. 6, by elevating the hinged upper plate 302 of the jig. If the common center is above the intersection of the cross-hair filaments when the upper hinged plate is not elevated on the lower base plate, the quartz is rotated 180 degrees by means of disk 314 to make the interference rings appear below the intersection of the cross-hair filaments (Fig. 8), and the upper plate is then elevated to center the rings. When the ring images are exactly centered in the manner illustrated in Fig. 6, disk 314 is locked by means of locking arm 326 and cam 327 and the elevating screw 310 is locked by means of locking nut 312. With the interference rings thus properly centered, the optical axis of the crystal will then be parallel to the bottom surface of base plate 300 of the jig and perpendicular to the reference edge 301 of the jig. "The hand" of the crystal may now be determined by rotating the analyzer 416 of the conoscope.

If the determination of the optical axis made in the conoscope does not coincide with the previously made determination of the same axis in the polariscope, which is ordinarily the case, the original saw cuts 527 and 528 are not perpendicular to the optical axis and they must now be made perpendicular to this axis by making "trim cuts," or sawing off just enough quartz to correct the windows. As an additional check on the accuracy of the Z-axis determination, the new pieces, cut off while making the trim cuts, can be checked by exposing the newly-obtained surface on the sliver to the X-rays in the X-ray analysis apparatus described in my co-pending application titled "Crystal analysis apparatus," Serial #594,468, filed May 18, 1945. The diffraction angle obtained in the X-ray apparatus will indicate whether the Z-axis is perpendicular to the plane of the window. If the X-ray apparatus reveals an additional error, it is corrected directly on the turn-table 500 of the cutting saw. If the original cuts 527 and 528 are not perpendicular to the optical axis of the crystal, the cutting jig is removed from the conoscope and placed once more on the turn-table of the sawing machine in the manner previously described, the reference edge 301 of the cutting jig again matching the reference edge 506 of turn-table 500. The new windows will be within fifteen minutes of the true angle.

Having obtained an orientation within ten or fifteen minutes of the true angle, the created Z-block is removed from the circular plate 314 of the cutting jig and cleaned.

The next step in the orienting process of the quartz is to locate precisely one of the electrical or X-axis, in the Z-block. This is outlined in my above-mentioned co-pending application.

To sum up the procedure followed in obtaining the position of the Z-axis in a piece of unfaced quartz crystal and the advantages of this procedure, approximate position of the Z-axis is first obtained in the polariscope with the quartz held by hand. The position of the quartz is carefully noted and with the quartz held in this position it is transferred to the tongs clamp with the tongs placed on both sides of the Z-axis, and turned so that the Z-axis is parallel to reference surface 233 and the bottom of plate 202. With the quartz secured in the clamp, the clamp is transferred from stand 201 to stand 24 and the position of the Z-axis is checked more carefully by using the ball-and-socket joint of the clamp, whereupon the clamp is removed from the polariscope and the quartz heated over a hot plate. The clamp is then mounted on stand 201, so that the quartz piece touches disk 314, whereupon the quartz is cemented to the cutting jig, the jig is then placed on the turn-table of the cutting saw and windows 527 and 528 are cut. During this transfer of the jig from stand 201 to the cutting table 500, the reference surfaces 233, 307 (or 309), 301, and 506, act as a means for transferring the Z-axis determinations obtained in the polariscope to the plane of the diamond saw disk 502, the plane of the latter being parallel to the plane of the reference surface 506 of the turn-table. With the windows thus cut, the jig is transferred to the conoscope where the referenece edge 301 is placed against reference edge 422 of the conoscope and the position of the Z-axis determined with a much higher precision obtainable in the conoscope, whereupon the jig is transferred once more to the turn-table of the cutting saw. During the determination of the position of the optical axis in the conoscope, the jig provides convenient mechanical means for changing the angle between the optical axis of the conoscope and the plane of the window. This angle may have vertical as well as horizontal components, and both components may be adjusted with the aid of the jig, the vertical component of the angle being adjusted by raising or lowering the upper plate 302, while the horizontal component of the angle is adjusted by rotating disk 314. The conoscope determination is transferred directly to the cutting saw without introducing any practically significant errors, the only possible error which may be introduced during the transfer being limited to infinitesimal irregularities which may exist between the previously mentioned reference surfaces in the conoscope, the jig, and the turn-table of the cutting saw. This error is much lower than the tolerated error of fifteen minutes.

It is believed that the construction and operation of the disclosed apparatus as well as the main advantages thereof will be apparent from the given description. It should be understood that while I have shown and described my invention in preferred form, reasonable changes and modifications may be made without departing from the spirit of the invention as sought to be defined in the following claims.

I claim:

1. In apparatus for manufacturing oscillator plates from crystals, in which the optical axis of the crystal is located by passing polarized light through the crystal while it is submerged in an immersion bath, the improvement comprising a container for the immersion bath, means for passing a beam of polarized light into the container in a predetermined direction, a guide support in fixed relationship with the container, a removable holder including a portion engaging the guide support in a predetermined position, means mounted on the holder for supporting a crystal supported thereon for rotation about one axis and tilting movement about another axis relative to the guide support engaging portion of the holder while the crystal is in the immersion bath and in the path of the polarized light beam entering the container, both of said axes being angularly related to the axis of said light beam a viewer mounted on the container and through which a crystal on said holder may be observed in said light beam as the crystal is rotated and tilted about said axes to determine by the appearance of typical concentric interference bands in the crystal when the optical axis of the crystal is coincident with the axis of the light beam.

2. Apparatus for processing an unfaced piezoelectric crystal, comprising a conoscope including an immersion tank, first reference surfaces within said tank, and an optical system for producing a beam of polarized substantially monochromatic light within said tank for determining the optical axis of said crystal; a crystal holding jig, having second reference surfaces, to which said crystal is affixed with an adjustable geometrical relationship between the optical axis of said crystal and said second reference surfaces, thus permitting the reproduction with respect to said first reference surfaces within said tank of the relationship between the optical axis of said crystal and said second reference surfaces by matching of said first and second reference surfaces; means for adjusting the position of said crystal with respect to said beam of polarized light with two degrees of freedom, whereby an accurate determination of the optical axis of said crystal with respect to said reference surfaces may be made; and a crystal cutting saw including means having third reference surfaces adapted to be matched with said second reference surfaces of said jig, whereby the relationship between the optical axis of said crystal and said second reference surfaces of said jig may be reproduced on said saw for cutting said crystal at a predetermined angle with said optical axis.

3. Apparatus for processing an unfaced piezoelectric crystal, comprising crystal axis determining apparatus including an immersion tank, first reference surfaces within said tank, an optical system for producing a polarized, substantially monochromatic beam of light within said tank, and a viewer, for determining the optical axis of said crystal; clamping means having second reference surfaces, for clamping said crystal with an adjustable geometrical relationship between the optical axis of said crystal and said second reference surfaces, whereby matching of said first and second reference surfaces reproduces, with respect to said first reference surfaces within said tank, the relationship between the optical axis of said crystal and said second referense surfaces; first means for adjusting the position of said crystal with respect to said beam of polarized light with two degrees of freedom, so that said crystal may be aligned within said tank and clamped into position relative to said reference surfaces; an adjustable crystal holding jig having third reference surfaces, to which said crystal is affixed with an adjustable geometrical relationship between the optical axis of said crystal and said third reference surfaces, after said second and third said reference surfaces have been matched, thus permitting the reproduction with respect to said third reference surfaces on said jig of the geometrical relationship between the optical axis of said crystal and said second reference surfaces; second means for adjusting the position of said crystal with respect to said third reference surfaces on said jig with two degrees of freedom, whereby matching of said first and third reference surfaces reproduces with respect to said first reference surfaces within said tank the geometrical relationship between the optical axis of said crystal and said third reference surfaces, and said second adjusting means enables an accurate determination of said optical axis with respect to said third reference surfaces to be made; and a crystal cutting saw including means having fourth reference surfaces adapted to be matched with said third reference surfaces of said jig, whereby the relationship between the optical axis of said crystal and said third reference surfaces of said jig is reproduced with respect to said fourth reference surfaces on said saw for cutting said crystal at a predetermined angle with said optical axis.

JOSEPH E. COLEMAN.

REFERENCES CITED

The following references are of record in the file of this patent:

UNITED STATES PATENTS

| Number | Name | Date |
| --- | --- | --- |
| 1,766,037 | Dawson | June 24, 1930 |
| 2,289,683 | Rzeppa et al. | July 14, 1942 |
| 2,326,319 | Bailey | Aug. 10, 1943 |
| 2,352,072 | Bond | June 20, 1944 |